United States Patent
De' Longhi

(10) Patent No.: US 8,402,882 B2
(45) Date of Patent: Mar. 26, 2013

(54) COFFEE MACHINE

(75) Inventor: Giuseppe De' Longhi, Trevisio (IT)

(73) Assignee: De' Longhi S.p.A., Treviso (IT)

( * ) Notice: Subject to any disclaimer, the term of this patent is extended or adjusted under 35 U.S.C. 154(b) by 587 days.

(21) Appl. No.: 12/669,696

(22) PCT Filed: Jul. 16, 2008

(86) PCT No.: PCT/EP2008/005806
§ 371 (c)(1),
(2), (4) Date: Jan. 19, 2010

(87) PCT Pub. No.: WO2009/010278
PCT Pub. Date: Jan. 22, 2009

(65) Prior Publication Data
US 2010/0192781 A1    Aug. 5, 2010

(30) Foreign Application Priority Data
Jul. 18, 2007  (IT) .............................. MI2007A1441

(51) Int. Cl.
*A47J 31/44* (2006.01)
(52) U.S. Cl. ..................... 99/289 R; 99/302 P
(58) Field of Classification Search ................. 99/289 R, 99/302 P, 302 R
See application file for complete search history.

(56) References Cited

U.S. PATENT DOCUMENTS

| 5,144,886 | A * | 9/1992 | Gockelmann et al. | 99/297 |
| 7,024,985 | B2 * | 4/2006 | Park | 99/302 P |
| 7,487,713 | B2 * | 2/2009 | Magno | 99/302 P |
| 7,571,674 | B2 * | 8/2009 | Wang | 99/302 P |
| 2005/0139080 | A1 * | 6/2005 | De'Longhi | 99/275 |

FOREIGN PATENT DOCUMENTS

| EP | 0486433 A | 5/1992 |
| EP | 0486435 A1 | 5/1992 |
| EP | 0913111 A1 | 5/1999 |

* cited by examiner

*Primary Examiner* — Reginald L Alexander
(74) *Attorney, Agent, or Firm* — Volpe and Koenig, P.C.

(57) ABSTRACT

The coffee machine comprises an infusion group having a main body formed by a shell delimiting a space for the movement of an infusion cylinder between a position of engagement with a closure piston for the creation of an infusion chamber and a position of disengagement from the closure piston for the loading of a coffee powder load, the infusion cylinder being rigidly supported by a rotatable carrier, a removable reciprocal engagement member between the infusion cylinder and the carrier being provided for the extraction of said infusion cylinder from a window of the shell, outside said shell, a translation member being further provided for translation of the carrier.

13 Claims, 7 Drawing Sheets

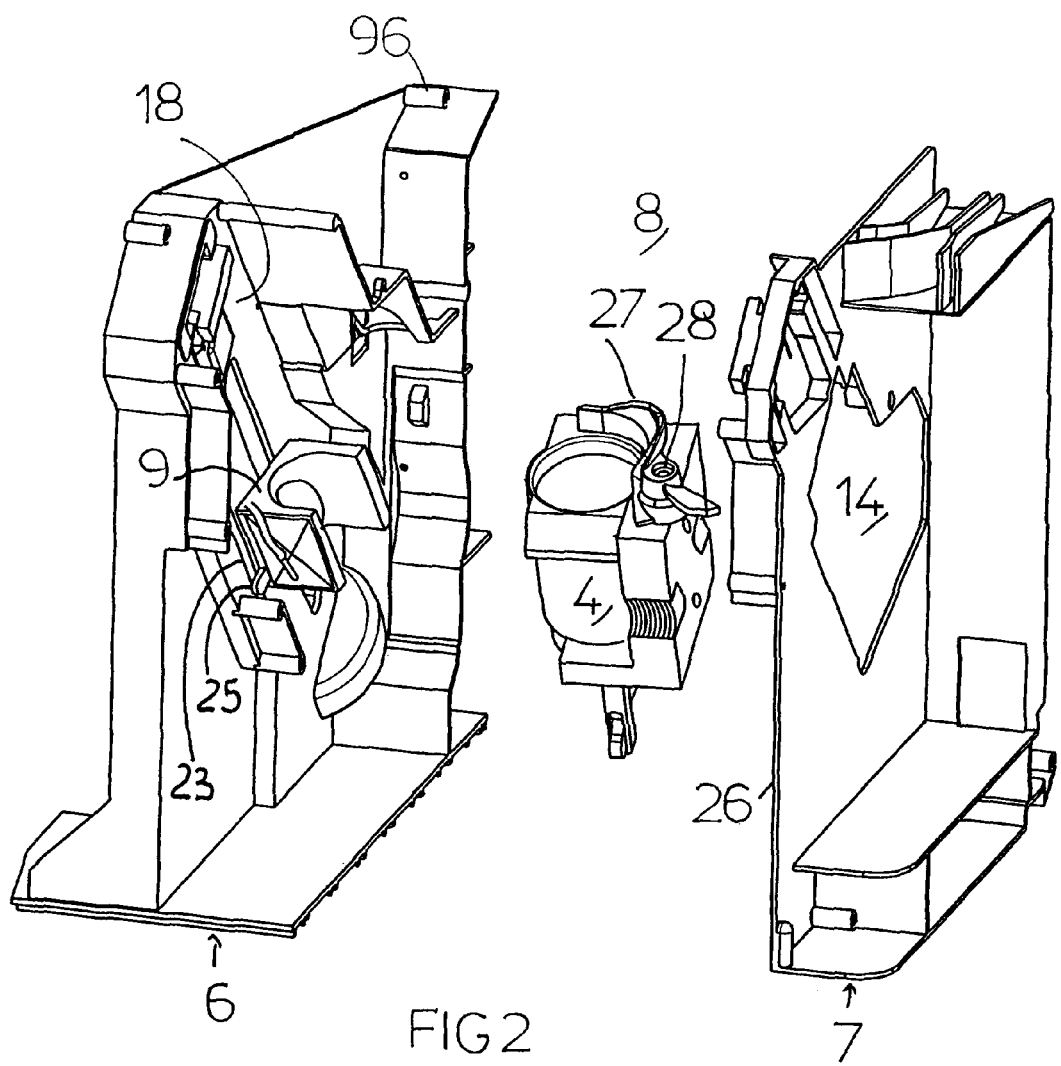

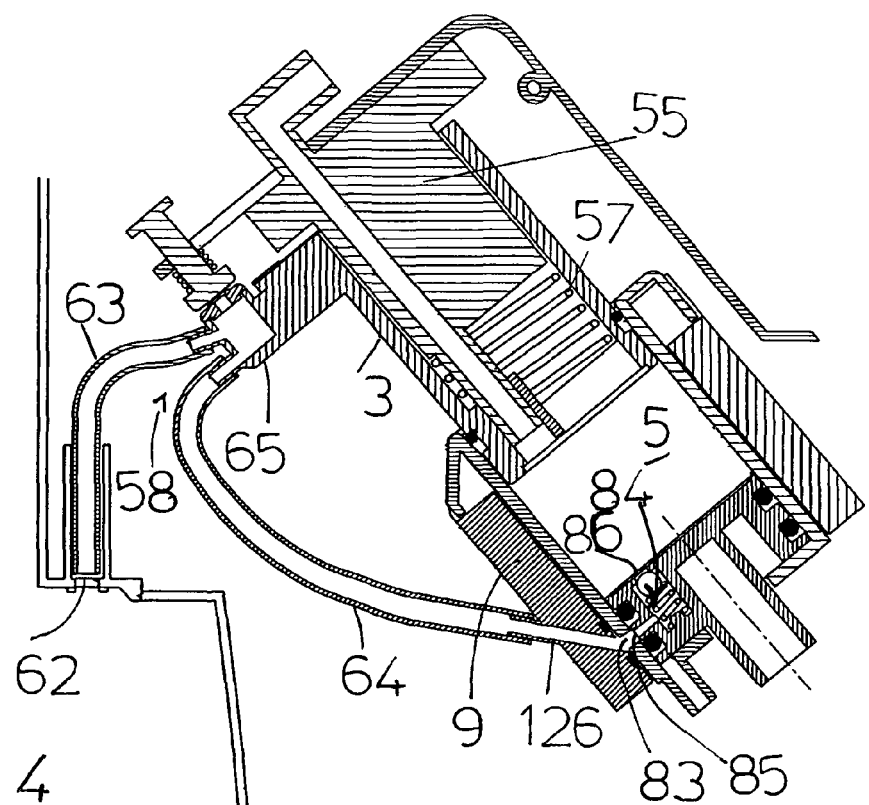
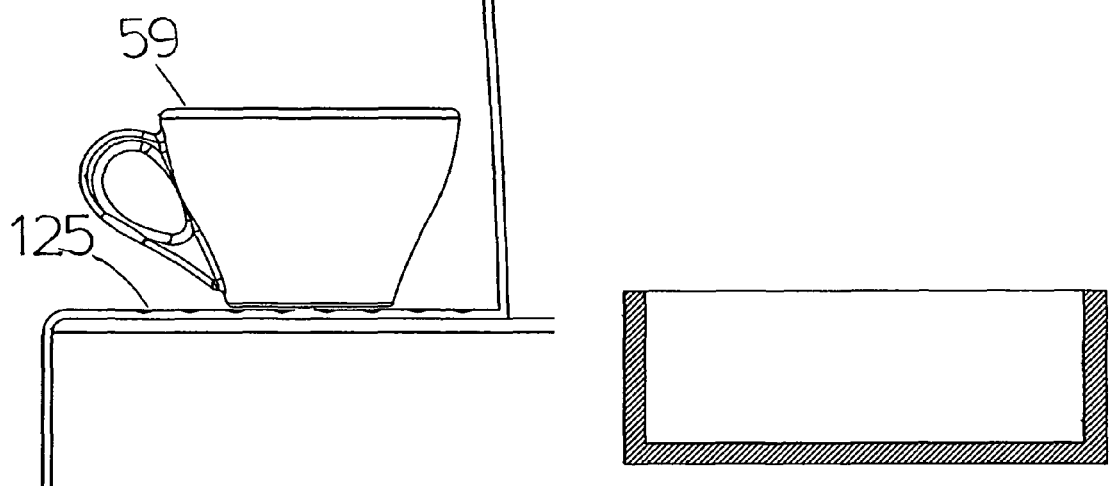
FIG. 4

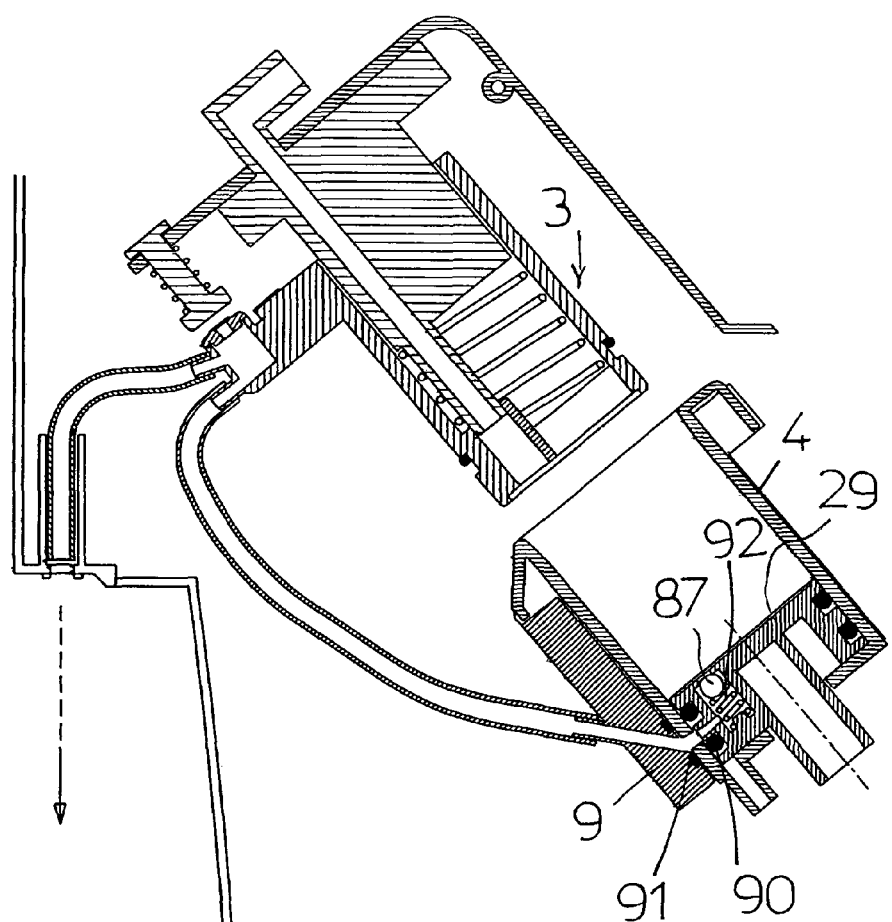
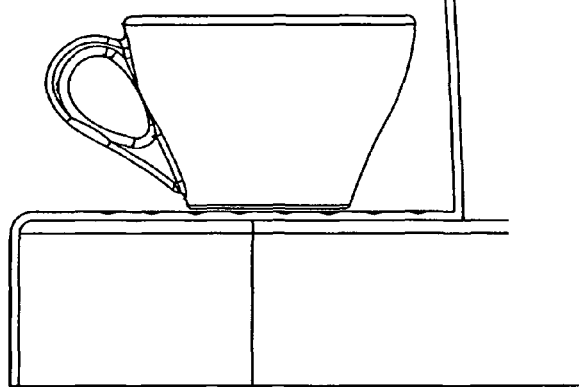
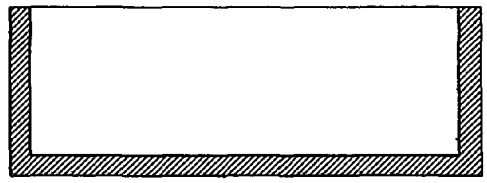
FIG 5

COFFEE MACHINE

FIELD OF THE INVENTION

The present invention relates to a machine for producing a coffee drink.

BACKGROUND

The traditional automatic or semi-automatic coffee machines comprise an infusion group having an infusion cylinder reversibly movable from a disengagement position to an engagement position with a closure piston for the creation of an infusion chamber into which the infusion water is conveyed which has been heated by a boiler, and conveyed through a suitable inner channelling to the closure piston.

The infusion cylinder instead has at its interior an expulsion piston which is moved in a coordinated manner with a scraper for the discharge of the load of spent coffee powder.

A functioning cycle in general comprises a step of loading the coffee powder load inside the infusion cylinder, a step of outgoing movement of the infusion cylinder towards the engagement position with the closure piston for the creation of the infusion chamber and the achievement of the infusion, and a step of return movement of the infusion cylinder which is disengaged from the closure piston for expelling the load of spent coffee powder and loading the new coffee powder load.

Such coffee machines can lament an excessive bulk due to the particular placement and structure of the infusion group and mechanisms with which it is equipped.

In general, the infusion group has its own support frame, in turn mounted on the casing of the machine. Sometimes the mounting of the infusion group to the related frame and the mounting of the frame of the infusion group to the casing of the machine can be difficult, complex and costly.

One such structure of the coffee machine can moreover constitute a further design constraint due to the compaction of the machine beyond a certain limit, and can lead to an increase in the overall number of components.

The increasingly heard market need to have the infusion cylinder dismountable, to be removed mainly for its cleaning and/or maintenance, has in general led to an increased structural complication of the infusion group.

The traditional machines can lament performance limits if long pauses occur between one functioning cycle and the next. In this case, it is necessary to wait an appropriate preheating time to ensure the attainment of the optimal temperature for the components of the hydraulic circuit.

The European patents EPO486433 and EPO486435 discuss a coffee machine.

The technical task which the present invention proposes is therefore that of making a machine for producing a coffee drink which permits eliminating the lamented technical drawbacks of the prior art.

SUMMARY

In the scope of this technical task, one object of the invention is that of making a highly efficient and reliable coffee machine, easily accessible to all of its internal parts, compact, constructively and structurally simple.

Not least object of the invention is that of making a high performance coffee machine which permits obtaining a quality drink, hot to the right point, even when it results from a functioning cycle following a long machine rest time.

The technical task, as well as these and other objects according to the present invention are achieved by making a coffee machine in accordance with the appended claims.

BRIEF DESCRIPTION OF THE DRAWINGS

Further characteristics and advantages of the invention will be clearer from the description of one or more preferred but not exclusive embodiments of the coffee machine according to the finding, illustrated as indicative and non-limiting in the attached drawings, in which:

FIG. 2 shows a perspective and exploded view of the main body of the infusion group of a coffee machine in accordance with the present finding;

FIGS. 4, 5 and 6 show the infusion cylinder/closure piston set of the coffee machine of FIG. 2 in the infusion position and in the two subsequent emptying steps of the duct which conveys the drink into remote supply position;

DETAILED DESCRIPTION OF THE PREFERRED EMBODIMENTS

Figure 1:
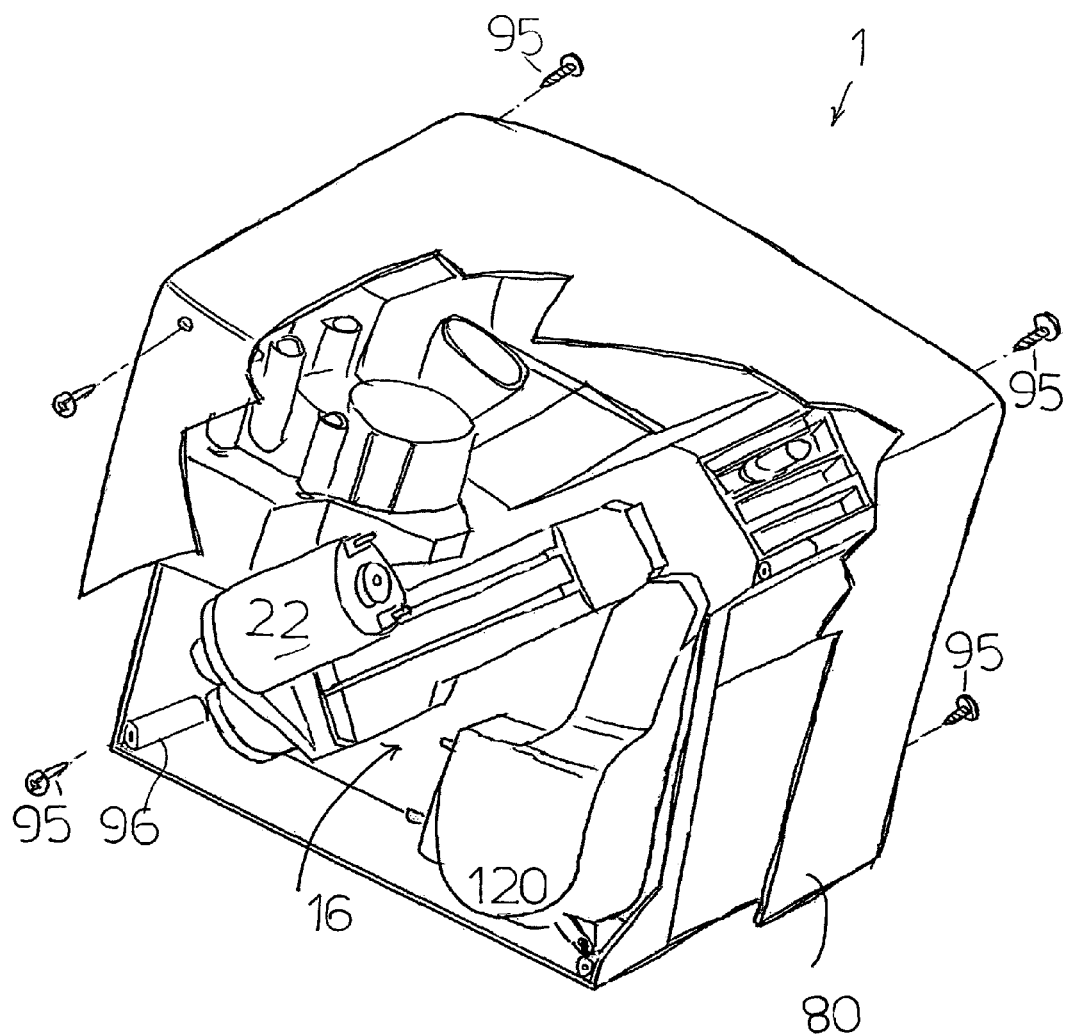
FIG. 1 shows a perspective and section view of a coffee machine in accordance with the present finding intended to highlight in a schematised manner how the main body of the infusion group represents a casing which supports the body and the other components of the coffee machine.
Figure 8:
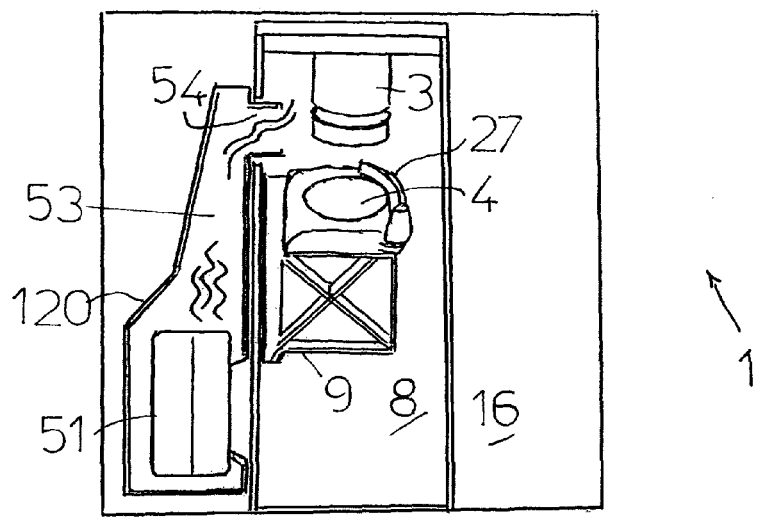
FIG. 8 shows a schematic view of a coffee machine in accordance with the present finding in which the recovery of the thermal energy of the boiler is provided for, for the preheating of at least one closure piston.
Figure 3:
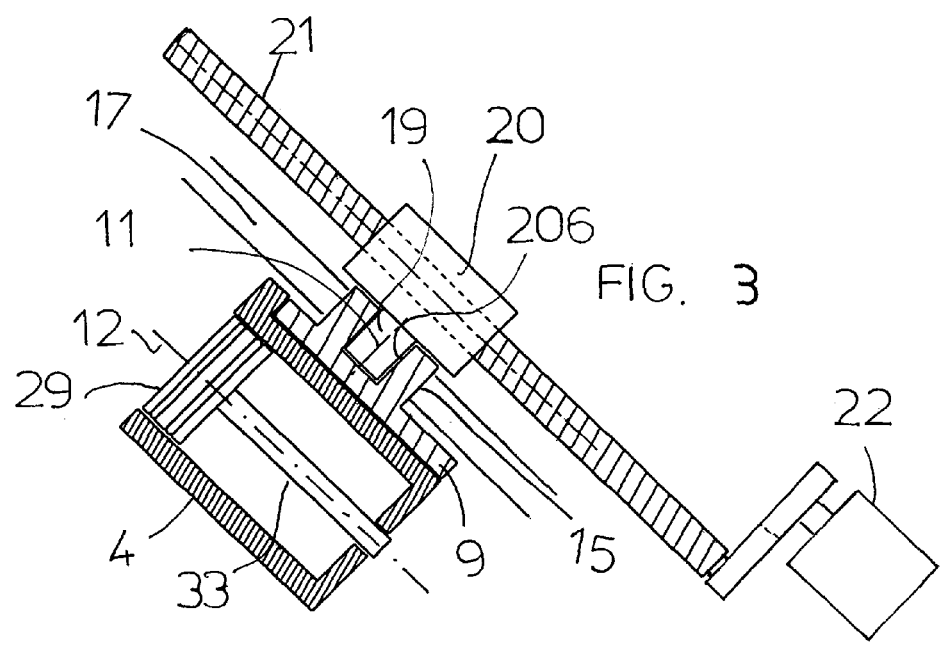
FIG. 3 show a schematic view of the movement group of the carrier of the coffee machine of FIG. 2.
Figure 6:
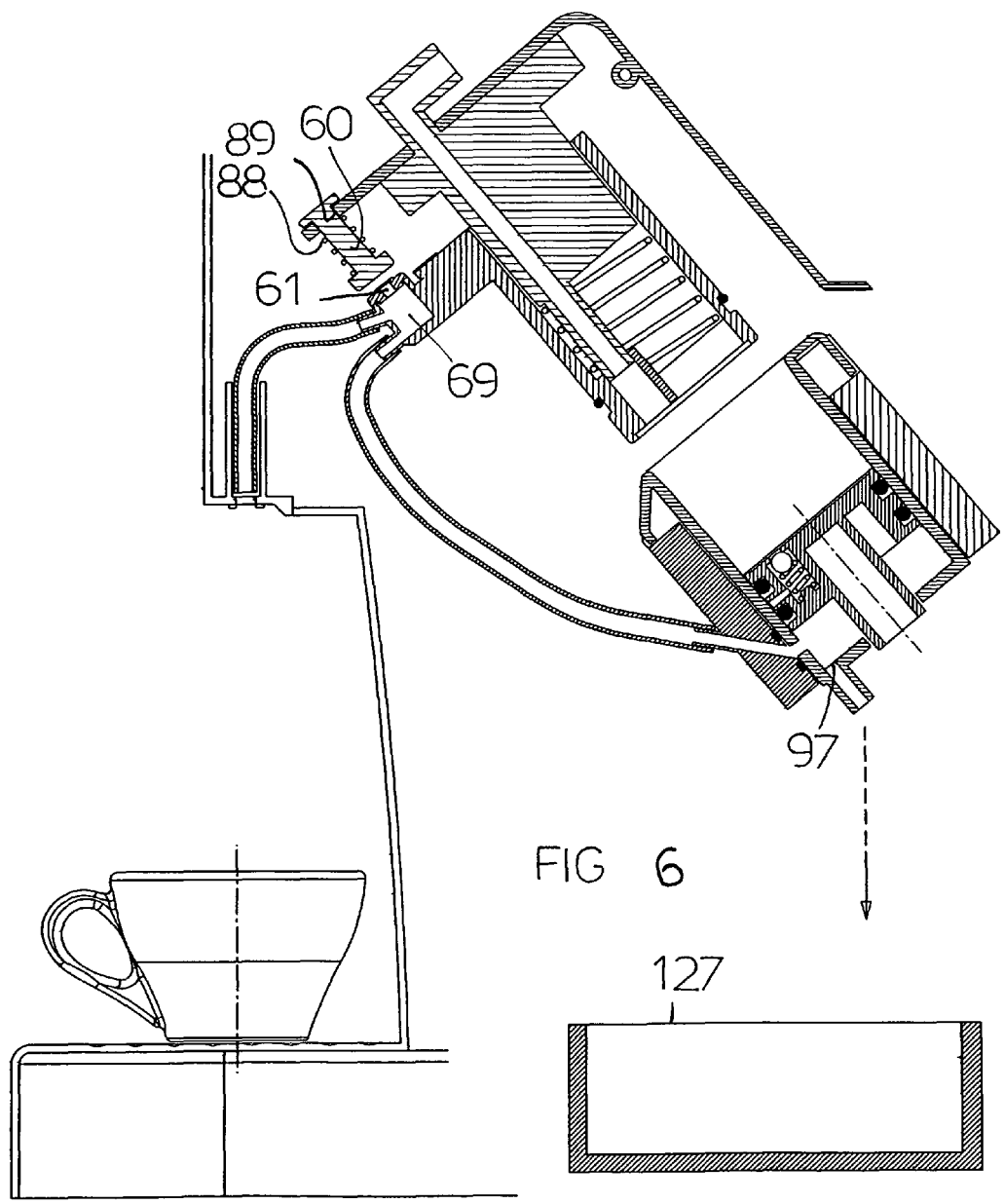
Figure 7:
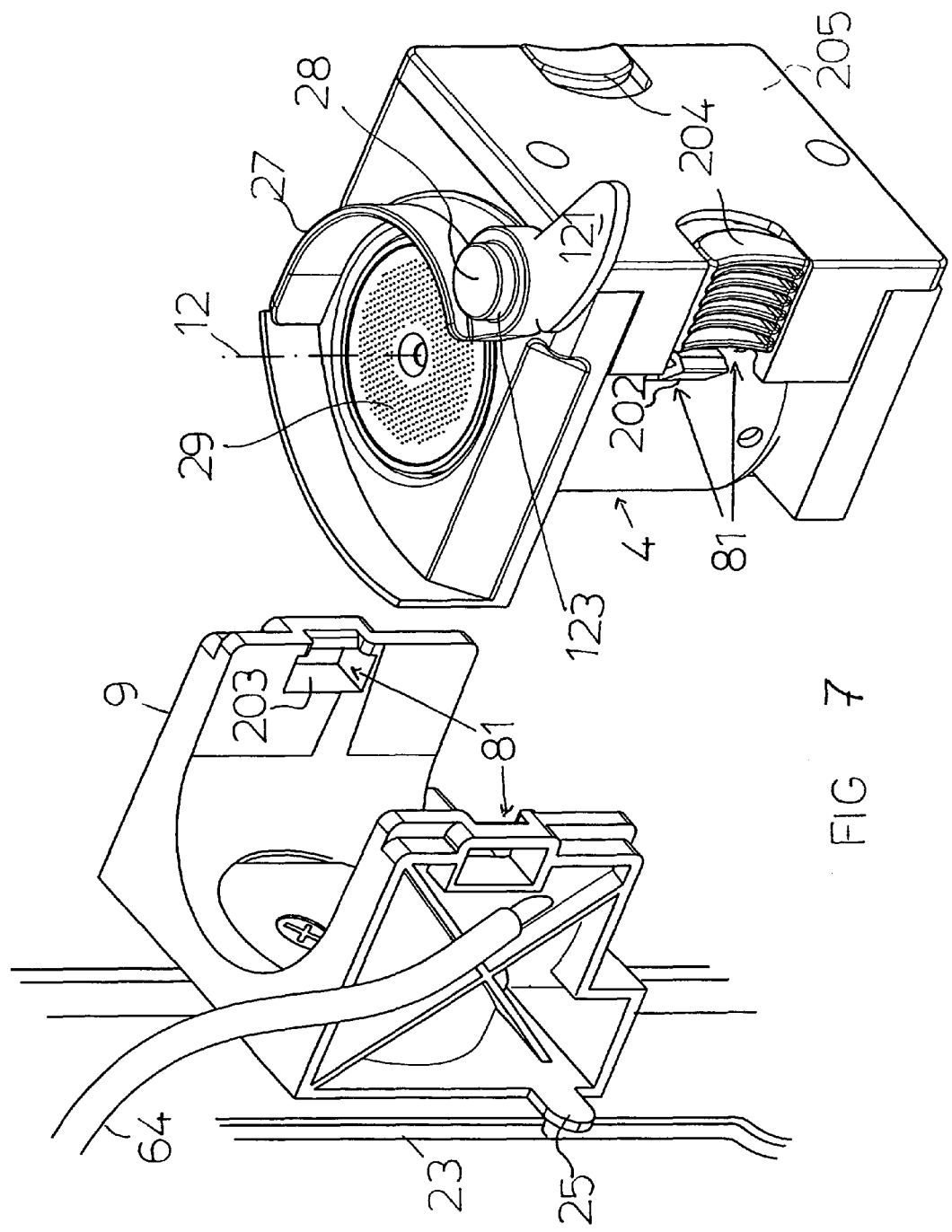
FIG. 7 shows the removable connection system between the carrier and the infusion cylinder of the machine of FIG. 2.

With reference to the mentioned figures, a coffee machine is shown indicated in its entirety with the reference number 1.

The coffee machine 1 comprises an infusion group having a main body 16 formed by a shell delimiting a space 8 for the reversible movement of an infusion cylinder 4 between a position of engagement with a closure piston 3 for the creation of an infusion chamber 5 and a position of disengagement from the closure piston 3 for the loading of a coffee powder load, in particular by means of a loader (not shown).

The shell preferably comprises a first and a second half-shell 6 and 7 associated with each other, which define the space 8 for the reversible movement of the infusion cylinder 4, but such shell can alternatively be made in a single-block structure or in more than two pieces.

The shell directly forms a casing, which supports the body 80 and the other components of the coffee machine 1.

In FIGS. 1 and 2, several connection screws 95 are shown as an example which can be tightened in appropriate seats 96 for associating the body 80 and other components of the coffee machine 1 to the main body 16 of the infusion group.

The infusion cylinder 4 is rigidly supported by a carrier 9 arranged inside the space 8.

The carrier 9 has a rotation axis 11 movable along a translation axis 10 oriented orthogonally to the rotation axis 11 and parallel to the axis 13 of the closure piston 3.

The axis 13 of the closure piston 3 is preferably-tilted with respect to the horizontal.

Means are provided for the rotation of the carrier 9 around the rotation axis 11, between a first angular position in which the axis 12 of the infusion cylinder 4 is oriented transversely to the translation axis 10 to carry out the loading of said coffee powder load, and a second angular position in which the axis 12 of the infusion cylinder is oriented parallel to the translation axis 10.

At the side of the infusion cylinder 4, means are moreover provided for the translation of the carrier 9 along the translation axis 10, to attain the position of engagement with the closure piston 3.

In particular, the closure piston 3 is supported in the upper part of the space 8 of the main body 16 of the infusion group 2 such that the infusion cylinder 4 is moved inside the space 8 towards the top to go in abutment with the closure piston 3 and towards the bottom to be disengaged from the closure piston 3, as shall be seen in detail below.

The closure piston 3 is in hydraulic connection with a boiler 51 from which it receives the infusion water, and it is fit with the interposition of an elastic element 57 on a support and guide element 55 rigidly fixed to the main body 16.

The closure piston 3 is movable along its axis 13 between a position consenting the opening of an inlet opening (not shown) for the infusion water (when the closure piston 3 is engaged with the infusion cylinder 4 with a pressure on the coffee powder present in the infusion chamber which is optimal for making the infusion) and a position not consenting the opening of such inlet opening (when the closure piston 3 is disengaged from the infusion cylinder 4 and when instead, while being engaged therewith, it determines a pressure on the coffee powders insufficient for an optimal infusion).

The boiler 51 advantageously has a cover jacket 120 which delimits an air chamber 53 in communication with the space 8 by means of a suitable opening 54 made on the wall of the main body 16 of the infusion group 2 which separates the boiler 51 from the space 8.

The infusion cylinder 4 and the carrier 9 have engaging means 81 for a preferably snap type removable reciprocal connection 81 adapted to allow the manual removal of the infusion cylinder 4 through a suitable window 14 of the main body 16 of the infusion group 2 which opens towards the space 8 and is accessible from outside the machine.

The means 81 are composed of retractable teeth 202 projecting from the side surface of the infusion cylinder 4 adapted to be engaged in corresponding recess 203 made on the carrier 9, and control buttons 204 of the retraction of the teeth 202 brought into a support 205 fixed to the infusion cylinder 4.

The possibility to remove the infusion cylinder 4 from the space 8 permits subjecting it to an inspection and cleaning operation in an extremely easy and simplified manner.

Preferably the water tank (not shown) of the coffee machine is positioned so as to cover the window 14.

The translation means of the carrier comprise a nut screw 20 engaged in a screw 21 oriented parallel to the translation axis 10 and drivable in rotation (but constrained with respect to its own axial translation) by a motor 22 (through a reduction gear and a transmission).

The translation means of the carrier 9 are positioned outside the space 8 and are also supported on the part 18 of the main body 16.

The nut screw 20 has a rotation pin 19 of the carrier 9 around its rotation axis 11.

The rotation pin 19 is engaged in a bush 206 of an attachment portion 15 of the carrier 9 positioned along a slide through slot 17 made in a first side wall 18 of the main body 16 and extending parallel to the translation axis 10.

The infusion group 2 has an expulsion system of the spent coffee powder load from the infusion chamber, comprising a scraper 27 pivoted in 28 at the side of the access mouth of the infusion cylinder 4 and movable in rotation in a coordinated manner with an expulsion piston 29 housed inside the infusion cylinder 4 with respect to which it is coaxially movable in translation between a retracted position adjacent to the base of the infusion cylinder 4 and an extracted position far from the base of the infusion cylinder 4.

The rotation means of the carrier 9 comprise a cam 23 for the rotation of the carrier 9, in which a projection 25 is engaged which projects from the carrier 9, or in a different embodiment from the infusion cylinder 4 or more precisely from a part support by the infusion cylinder, such as the rod 33 of the expulsion piston 29.

The rotation cam 23 is also made through the first side wall 18 of the main body 16 of the infusion group 2.

The rotation cam 23 of the carrier 9 is a shaped slot which in particular can be made separate and distinct from the slide slot 17, or which can be made in a different embodiment on the extension of the slide slot 17.

Facing the first side wall 18 of the main body 16 of the infusion group 2 is a second side wall 26 of the main body 16 of the infusion group 2 where the window 14 is present for the extraction of the infusion cylinder 4.

The driving means of the expulsion piston 29 are placed below the base of the infusion cylinder 4 inside the space 8.

The kinematic driving mechanism of the scraper 27 comprises a suitable cam 121 which projects from the scraper 27 to drive in rotation the latter so to sweep the access mouth of the infusion cylinder 4 at which the expulsion piston 29 has brought the load of spent coffee powder. The scraper 27 more in particular has a hinging pin 123 parallel to the axis 12 of the infusion cylinder 4 and is moved against and driven by a return spring (not shown) towards the rest position at the side of the access mouth to the infusion cylinder 4.

According to a particularly advantageous aspect of the invention, the coffee machine 1 comprises a duct 58 which conveys the drink produced in the infusion' chamber 5 towards a remote dispenser 62, means for the selective hydraulic connection of the duct 58 with the infusion chamber 5 or with a discharge line, and means permitting the discharge of the drink remaining inside the conveyance duct 58 at the end of every functioning cycle of the coffee machine 1.

The placement of the dispenser 62 in a appropriate point which is distant from the infusion chamber 5 makes the coffee machine 1 still more compact in height (the preferably tilted orientation of a translation axis for the infusion cylinder 4 already allows limiting the overall bulk of the coffee machine, in height and width or depth) while ensuring an optimal distance of the dispenser 62 from the underlying tray 125 on which cups 59 of different height (espresso, cappuccino cups) can be laid as well as special containers for loading a number of coffee drink portions.

The conveyance duct 58 comprises a first and a second flexible tube 63 and 64 having a first end thereof in communication through a chamber 69 made in a block 65.

The block 65 supports the first end of the first and second flexible tube 63 and 64 and is in turn supported by the closure piston 3, positioned at the side thereof.

The second end of the first tube 63 is connected to the dispenser 62 while the second end of the second tube 64 is connected by means of a connection element 126 to an outlet hole 83 of the drink from the infusion chamber 5.

The connector 126 is made directly through the thickness of the carrier 9.

The outlet hole 83 is made in the lower portion of the side wall of the infusion chamber 4.

The selective hydraulic connection means comprise an inner duct 84 of the expulsion piston 29, which is opened at a first end 85 thereof on the side surface of the expulsion piston 29 and at a second end 86 thereof on the front surface of the expulsion 29, and a discharge opening 97 from the infusion cylinder 4 made through the base of the infusion cylinder 4. The first end 85 of the duct 84 is in a position such to be aligned with the outlet hole 83 when the expulsion piston 29 is retracted.

Around the first end 85 of the duct 84 and around the outlet hole 83, a hydraulic seal gasket 90 and 91 are respectively present.

The duct 84 has an opening valve sensitive to the inner pressure of the infusion chamber 5 and comprising a spherical shutter 87 which is movable against and driven by a spring 92.

The means permitting the discharge of the drink remaining inside the conveyance duct 58 comprise a shutter 60 of a hole 61 in direct communication with the atmosphere positioned along the conveyance duct 58. More precisely, the hole 61 is made through the wall thickness of the chamber 69 present in the block 65.

The shutter 60 and the hole 61 are aligned parallel to the axis 13 of the closure piston 3 along which they are movable between a contact position for the closure of the hole 61 during the infusion and a spaced position for the opening of the hole 61 at the end of the infusion, for the unloading by gravity of the drink remaining inside the conveyance duct 58.

The shutter 60 is in particular a small piston constrained with the interposition of a spring 88 and a hole 89 of the main body 16 of the infusion group 2.

The functioning of the coffee machine 1 is briefly as follows.

The infusion cylinder 4 is found at travel start below the loader of the coffee powder and preferably with axis slightly tilted back with respected to the vertical.

The expulsion piston 29 is in retracted position.

At the end of the loading of the coffee powder in the infusion cylinder 4, the motor 22 starts and drives the screw 21 in rotation, along which the nut screw 20 is induced to translate.

The carrier 9, pivoted to the slider 15 integrally fixed to the nut screw 20, begins to bring the infusion cylinder 4 upward.

During the initial part of ascent, the projection 25 follows a curvilinear section of the rotation cam 23 which causes the rotation of the infusion cylinder until the axis 12 of the infusion cylinder 4 is aligned with the axis 13 of the closure piston 3.

Such rotation of the infusion cylinder 4 also generates a certain levelling of the coffee powder just poured into the infusion cylinder 4.

From this moment, the upward driving proceeds with the same angular orientation of the infusion cylinder 4, since the remaining section of the rotation cam 23 is rectilinear and parallel to the translation axis 10 of the infusion cylinder 4.

The infusion cylinder 4 comes to be engaged with the closure piston 3.

The contact pressure of the infusion cylinder 4 against the closure piston 3 creates an axial retraction force of the closure piston 3 along the support and guide element 55.

At the movement of the closure piston 3 with respect to the support and guide element 55 which determines the optimal compaction of the coffee powder for the infusion, the flow opening of the infusion chamber 5 is opened for the infusion water which comes from the boiler 51 and crosses the closure piston 3.

The infusion cylinder 4 is stopped in this position with the expulsion piston 29 which is maintained in a retracted position at which the first end 85 of the duct 84 is aligned with the outlet hole 83, while the shutter 60 closes the hole 61. Consequently, the dispenser 62 is in communication with the infusion chamber 5.

During the infusion, when the pressure of the infusion present in the infusion chamber 5 reaches a sufficient value to make the spherical shutter 87 move backward, overcoming the reaction of the spring 92, the inner duct 84 is opened of the expulsion piston 29 and the drink appropriately channelled into the conveyance duct 58 reaches the dispenser 62, from which it is supplied into the cup 59.

At the end of the infusion, the descent movement begins of the infusion cylinder 4, made possible by the rotation inversion of the motor 22.

In the first part of the descending movement, the shutter 60 frees the hole 61 and places the conveyance duct 58 in communication with the atmosphere, while the expulsion piston 29 is not moved with respect to the infusion cylinder 4 so that the inner duct 84 of the expulsion piston 29 remains hydraulically connected to the conveyance duct 58: only the liquid residue present in the first flexible tube 63 in this moment is downloaded into is discharged into cup 59, completing its filling.

After completing a further descent section, the infusion cylinder 4 is disengaged from the closure piston 3 and the kinematic movement mechanism of the expulsion piston 29 begins to draw it out from the infusion cylinder 4, until it causes the closure of the hydraulic connection between the inner duct 84 of the expulsion piston 29 and the conveyance duct 58 and the opening of the hydraulic connection between the conveyance duct 58 and the discharge opening 97, causing the unloading by gravity into a suitable container 127 of the residue liquid present in the second flexible tube 64.

After the expulsion of the spent coffee powder load, during a further terminal descent section of the infusion cylinder 4, the projection 25 once again follows the curvilinear section of the rotation cam 23, which causes the counter-rotation of the infusion cylinder 4 until its axis 12 is aligned with the overlying loader.

The process for the control of the coffee machine 1 functioning conditions has the particular characteristic that at least part of the thermal energy dissipated by the boiler 51 is recovered, conveying it at least towards the closure piston 3 for its preheating before a subsequent functioning cycle of the coffee machine 1.

If necessary, the air present inside the cover jacket 120 of the boiler 51 is used, which is heated by the thermal energy dissipated by the boiler 51 itself during and after its functioning, and which is in communication, through the opening 54, with the adjacent space 8 in which the closure piston 3 is present.

In particular, it is possible that such residual thermal energy is also conveyed towards the infusion cylinder 4 for its preheating first of a subsequent functioning cycle of the machine, for example in such a manner that at the end of a functioning cycle the infusion cylinder 4 carries out the descent not immediately but only when the execution of the subsequent functioning cycle of the coffee machine is ordered.

The coffee machine thus conceived is susceptible of many modifications and variations, all of which fall within the scope of the inventive concept; moreover all details can be replaced by technically equivalent elements.

In practice, the materials used, as well as dimensions, can be of any type according to the particular requirements and the state of the art.

The invention claimed is:

1. A coffee machine comprising an infusion group having an infusion cylinder and a main body formed by a shell, comprising a window, and delimiting a space for a reversible movement of the infusion cylinder between a position of engagement with a closure piston for the creation of an infusion chamber and a position of disengagement from said closure piston for the loading of a coffee powder load, said infusion cylinder being rigidly supported by a carrier having a translation axis and a movable rotation axis along the translation axis oriented orthogonally to said rotation axis and parallel to the axis of said closure piston, a removable reciprocal engagement member between said infusion cylinder and said carrier being provided for the extraction of said infusion cylinder from the window of said shell, a rotation member being provided of said carrier around said rotation axis between a first angular position in which the axis of said infusion cylinder is oriented transversely to said translation axis to execute said loading of said coffee powder load, and a second angular position in which the axis of said infusion cylinder is oriented parallel to said translation axis, the coffee machine further comprising a conveyance duct adapted to convey a drink produced in said infusion chamber towards a remote dispenser, a connector for the selective hydraulic connection of said conveyance duct with said infusion chamber or with a discharge path, and a discharger permitting the discharge of any drink remaining inside said conveyance duct at the end of every functioning cycle of said coffee machine, wherein outside said shell, a translation member is provided for translation of said carrier along said translation axis to attain said engagement position with said closure piston.

2. The coffee machine according to claim 1, wherein the axis of said closure piston is tilted with respect to the horizontal.

3. The coffee machine according to claim 1, wherein said shell directly forms a casing for said coffee machine which supports the body and other components of said coffee machine.

4. The coffee machine according to claim 1, wherein said shell comprises a first and a second half-shell associated with each other.

5. The coffee machine according to claim 1, wherein said closure piston is fit on a fixed guide and support element, and is movable along its own axis along said support and guide element between a position consenting the opening of an inlet opening for the infusion water into said infusion chamber and a position not consenting the opening of said inlet opening.

6. The coffee machine according claim 1, wherein said conveyance duct comprises a first and a second flexible tube having a first end thereof in communication through a chamber made in a block which supports a first end of said first and second flexible tube and which is supported by said closure piston and positioned at a side thereof.

7. The coffee machine according to claim 6, wherein a second end of said first flexible tube is connected to said dispenser while a second end of said second flexible tube is connected by a connection element to an outlet hole of the drink from said infusion chamber, said connection element being made directly through the body of said carrier.

8. The coffee machine according to claim 1, wherein said selective hydraulic connector comprises a discharge opening from said infusion chamber made through the base of said infusion cylinder and an inner duct to an expulsion piston housed in said infusion cylinder, said inner duct being opened at a first end thereof on the side surface of said expulsion piston and at a second end thereof on the front surface of said expulsion piston.

9. The coffee machine according to claim 1, wherein said discharger permitting the discharge comprises a shutter of a hole in direct communication with the atmosphere positioned along said conveyance duct.

10. The coffee machine according to claim 9, wherein said hole in direct communication with the atmosphere is present through the wall thickness of said chamber made in said block.

11. The coffee machine according to claim 1, wherein said translation member comprises a nut screw engaged in a screw oriented parallel to said translation axis and drivable by a motor supported by said main body.

12. The coffee machine according to claim 11, wherein said nut screw has a rotation pin which is engaged in an attachment portion of said carrier position along a slide through slot made in a first side wall of said main body and being extended parallel to said translation axis.

13. The coffee machine according to claim 1, wherein said rotation member comprises a cam for the rotation of said infusion cylinder in which a jutting projection is engaged by said carrier or by the stem of said expulsion piston.

\* \* \* \* \*